(12) United States Patent
Nolin et al.

(10) Patent No.: US 11,059,533 B2
(45) Date of Patent: Jul. 13, 2021

(54) VEHICLE WITH BRAKE TRACTION CONTROL AND METHOD FOR CONTROLLING TRACTION OF A VEHICLE

(71) Applicant: BOMBARDIER RECREATIONAL PRODUCTS INC., Valcourt (CA)

(72) Inventors: Christian Nolin, St-Denis-de-Brompton (CA); Antoine Bezeau-Tremblay, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 364 days.

(21) Appl. No.: 16/142,631

(22) Filed: Sep. 26, 2018

(65) Prior Publication Data

US 2020/0094896 A1 Mar. 26, 2020

(51) Int. Cl.
*B60T 8/175* (2006.01)
*B62D 63/04* (2006.01)
(Continued)

(52) U.S. Cl.
CPC ............ *B62D 63/04* (2013.01); *B60K 17/352* (2013.01); *B60R 21/13* (2013.01); *B60T 8/1701* (2013.01); *B60T 8/1769* (2013.01); *B60T 8/322* (2013.01); *B60W 10/12* (2013.01); *B60W 10/184* (2013.01); *B60W 30/18172* (2013.01);
(Continued)

(58) Field of Classification Search
CPC .............................. B60K 17/352; B60T 8/175
See application file for complete search history.

(56) References Cited

U.S. PATENT DOCUMENTS 4,813,706 A * 3/1989 Kincheloe ............... B60R 21/13
280/756
4,875,171 A * 10/1989 Fujioka ................... B60T 8/175
700/280

(Continued)

FOREIGN PATENT DOCUMENTS

| DE | 102010031140 A1 | 1/2012 |
| EP | 2868958 A1 | 5/2015 |
| JP | 2014148308 A | 8/2014 |

OTHER PUBLICATIONS

Machine translation of JP2014148308A; retrieved from http://translationportal.epo.org/ on Nov. 20, 2018.

(Continued)

*Primary Examiner* — Tony H Winner
(74) *Attorney, Agent, or Firm* — BCF LLP

(57) ABSTRACT

A vehicle includes front suspension assemblies; rear suspension assemblies; a left driven wheel and a right driven wheel with first left and right brake assemblies; a left wheel and a right wheel with second left and right brake assemblies; an anti-lock braking system (ABS) module; a drive mode coupler connected between the transmission and the left and right wheels for changing between a 2×4 and a 4×4 drive configuration; and a drive mode switch for controlling the drive mode coupler, the ABS module selectively performing brake traction control of at least one wheel based on the position of the drive mode switch. A method for controlling traction of the vehicle includes sensing the drive mode switch position and when the drive mode changes from a 2×4 position to a 4×4 position, causing the ABS module to perform brake traction control on at least one wheel.

19 Claims, 9 Drawing Sheets

(51) Int. Cl.
*B62D 1/02* (2006.01)
*B62D 1/04* (2006.01)
*F16H 48/30* (2012.01)
*B60R 21/13* (2006.01)
*B60T 8/17* (2006.01)
*B60W 10/184* (2012.01)
*B60W 10/12* (2012.01)
*B60T 8/32* (2006.01)
*B60W 30/18* (2012.01)
*B60T 8/1769* (2006.01)

(52) U.S. Cl.
CPC ............... *B62D 1/02* (2013.01); *B62D 1/04* (2013.01); *B60T 2240/00* (2013.01); *B60T 2250/00* (2013.01); *B60T 2250/04* (2013.01); *B60T 2270/12* (2013.01); *B60T 2270/202* (2013.01); *B60W 2510/0604* (2013.01); *B60W 2510/0657* (2013.01); *B60W 2510/18* (2013.01); *B60W 2710/12* (2013.01); *B60W 2710/18* (2013.01); *B60W 2720/26* (2013.01)

(56) References Cited

U.S. PATENT DOCUMENTS

| | | | | |
|---|---|---|---|---|
| 5,704,694 | A * | 1/1998 | Kozakai | B60T 8/175 |
| | | | | 303/113.2 |
| 9,327,587 | B2 * | 5/2016 | Spindler | B60G 3/00 |
| 2002/0088661 | A1 | 7/2002 | Gagnon et al. | |
| 2002/0195873 | A1 * | 12/2002 | Fawkes | B60K 28/16 |
| | | | | 303/139 |
| 2005/0228568 | A1 | 10/2005 | Hack et al. | |
| 2015/0134220 | A1 * | 5/2015 | Kim | B60T 8/245 |
| | | | | 701/83 |
| 2015/0360657 | A1 * | 12/2015 | Sung | B60T 8/172 |
| | | | | 701/83 |
| 2017/0240150 | A1 * | 8/2017 | Frijas | B60T 8/175 |

OTHER PUBLICATIONS

Machine translation of DE102010031140A1; retrieved from http://translationportal.epo.org/ on Nov. 20, 2018.

* cited by examiner

VEHICLE WITH BRAKE TRACTION CONTROL AND METHOD FOR CONTROLLING TRACTION OF A VEHICLE

TECHNOLOGICAL FIELD

The present technology relates to vehicles with brake traction control and methods for controlling traction of a vehicle.

BACKGROUND

Many four-wheel drive vehicles are provided with at least one open differential which drives a pair of wheels while allowing the wheels to rotate independently. However, when one wheel loses traction, power from the motor follows the path of least resistance and applies all torque to the wheel with no or less traction.

As such many vehicles, especially off-road vehicles, need traction control in order to maintain control and movement when encountering slippery ground, due to weather and/or terrain conditions. Referred to as traction control, there are different solutions for providing power to the wheel with more traction when its opposite wheel has lost traction.

In order to provide power to the wheel with more traction, vehicles are sometimes provided with a limited slip differential (LSD). Limited slip differentials allow for the partial transfer of motor power from a wheel with less traction to its opposite wheel with more traction. This is done by limiting the independence between the two wheels, such that the amount of power sent to either wheel is limited. In this way, each wheel always receives some portion of the power from the motor. Correspondingly, the amount of power sent to either wheel is limited, and the amount of power sent to the wheel with more traction can never be all of the power from the motor. Limited slip differentials are also more expensive, heavier and require more maintenance than an open differential.

Some vehicles utilize instead a locking differential, where the differential can be switched between a locked configuration and an open configuration. In the locked configuration, the wheels are locked into the same rate of rotation and both wheels receive the same amount of power. In the open configuration, the wheels are allowed to rotate independently, similar to an open differential. In this case, in the locked configuration, neither wheel can receive more than half of the power from the motor. Similarly to LSDs, locking differentials are more expensive, heavier and require more maintenance than an open differential.

Additionally, some vehicles are also provided with the option of changing from a 2×4 wheel drive mode to a 4×4 wheel drive mode. In these vehicles, some sort of traction control is still desirable for the wheels that receive power from the motor only when the vehicle is in 4×4 drive mode. Installing an LSD or a locking differential on these wheels, however, adds additional complication, weight, and expense in comparison to an open differential. Further, traction control is unnecessary when the wheels are not being driven.

There is therefore a desire for a system and method for controlling traction in a vehicle, including off-road vehicles, while avoiding at least some of the above disadvantages.

SUMMARY

It is an object of the present technology to ameliorate at least some of the inconveniences present in the prior art.

According to an aspect of the present technology, there is provided a system and method for selectively implementing brake traction control (BTC) on wheels driven only when the vehicle is in a 4×4 drive mode, the wheels being operatively connected by an open differential. By sensing the position of a drive mode switch, an ABS module can selectively activate BTC only when the drive mode switch indicates that the vehicle is in 4×4 drive mode. In this way, the wheels are allowed to rotate independently (via the open differential) unless the wheels are being driven and traction control is needed. Use of the open differential when the wheels are not driven or when there is no need for traction control benefits the vehicle by having fewer parts (as the control is implemented electronically and only in 4×4 drive mode) and so is lighter and requires less maintenance than if traction controlling differentials were utilized.

According to an aspect of the present technology, there is provided a vehicle including a frame; a motor connected to the frame; a pair of front suspension assemblies connected to the frame; a pair of rear suspension assemblies connected to the frame; a left driven wheel and a right driven wheel connected to one of the pair of front suspension assemblies and the pair of rear suspension assemblies; a first left brake assembly operatively connected to the left driven wheel; a first right brake assembly operatively connected to the right driven wheel; a left wheel and a right wheel connected to an other one of the pair of front suspension assemblies and the pair of rear suspension assemblies; a second left brake assembly operatively connected to the left wheel; a second right brake assembly operatively connected to the right wheel; an anti-lock braking system (ABS) module for selectively controlling the brake assemblies, the ABS module being communicatively connected to the first left brake assembly, the first right brake assembly, the second left brake assembly, and the second right brake assembly; a transmission operatively connected to the motor for receiving torque from the motor, the left and right driven wheels being operatively connected to the transmission; a drive mode coupler connected between the transmission and the left and right wheels, the drive mode coupler causing the vehicle to change between a 2×4 drive configuration and a 4×4 drive configuration by selectively coupling the transmission and the left and right wheels for selectively driving the left and right wheels; and a drive mode switch operatively connected to the drive mode coupler, a position of the drive mode switch being selectively moveable between a 2×4 position and a 4×4 position, the drive mode switch being communicatively connected to the ABS module, the drive mode switch causing the drive mode coupler to change to one of the 2×4 drive configuration and the 4×4 drive configuration when the drive mode switch is moved to a corresponding one of the 2×4 position and the 4×4 position, the ABS module selectively performing brake traction control of at least one of the left wheel and the right wheel based on the position of the drive mode switch.

In some implementations, the ABS module selectively performs brake traction control of the at least one of the left wheel and the right wheel when the drive mode switch is in the 4×4 position.

In some implementations, no brake traction control is performed on the at least one of the left wheel and the right wheel when the drive mode switch is in the 2×4 position.

In some implementations, the vehicle further includes a first differential operatively connected between the left wheel and the right wheel, the first differential being an open differential.

In some implementations, the vehicle further includes a second differential operatively connected between the transmission and the left and right driven wheels, the second differential being a locking differential changeable between a locked differential mode and an unlocked differential mode.

In some implementations, the ABS module further selectively performs traction control on the left driven wheel and the right driven wheel when the second differential is in the unlocked differential mode.

In some implementations, the vehicle further includes a differential switch communicatively connected to a controller communicatively connected to the second differential, the controller selectively changing the second differential to one of the locked differential mode and the unlocked differential mode when the differential switch is moved to a corresponding one of a locked mode position and an unlocked mode position.

In some implementations, the vehicle is a side-by-side vehicle comprising a dashboard; and the differential switch is a manual switch disposed on the dashboard.

In some implementations, the vehicle is an all-terrain vehicle comprising a handlebar; and the differential switch is a manual switch disposed on the handlebar.

In some implementations, the vehicle is a side-by-side vehicle comprising a dashboard; and the drive mode switch is a manual switch disposed on the dashboard.

In some implementations, the vehicle is an all-terrain vehicle comprising a handlebar; and the drive mode switch is a manual switch disposed on the handlebar.

In some implementations, the vehicle further includes a plurality of speed sensors operatively connected to at least the left and right wheels, the plurality of speed sensors being communicatively connected to the ABS module; and at least one of a throttle position sensor communicatively connected to the ABS module, a pedal position sensor communicatively connected to the ABS module, and an engine control module for determining engine torque output communicatively connected to the ABS module.

In some implementations, the vehicle is a side-by-side vehicle (SSV); and further includes two seats connected to the frame, the two seats being disposed side by side; a roll cage connected to the frame and extending at least partially over the two seats; and a steering wheel operatively connected to one of: the left and right wheels, and the left and right driven wheels.

In some implementations, the vehicle is an all-terrain vehicle (ATV); and further includes a straddle seat connected to the frame; and a handlebar operatively connected to one of: the left and right wheels, and the left and right driven wheels.

According to an aspect of the present technology, there is provided a method for controlling traction of a vehicle, the vehicle having: a motor; a left driven wheel and a right driven wheel coupled to and driven by the motor, the left and right driven wheels being one of front wheels of the vehicle and rear wheels of the vehicle; and a left wheel and a right wheel, the left and right wheels being an other one of the front wheels and the rear wheels. The method includes sensing a position of a drive mode switch, the drive mode switch having a 2×4 position and a 4×4 position; when the drive mode changes from a 2×4 position to a 4×4 position: coupling the left and right wheels to the motor; determining that at least one of the left and right wheels is slipping; and causing an anti-lock braking system (ABS) module of the vehicle to perform brake traction control on at least one of the left wheel and the right wheel; and when the drive mode changes from a 4×4 position to a 2×4 position: uncoupling the left and right wheels from the motor.

In some implementations, determining that at least one of the left and right wheels is slipping includes determining that an engine torque indicator is above a pre-determined engine threshold; and in response to the engine torque indicator being above the pre-determined engine threshold, causing the ABS module to perform brake traction control on the at least one of the left wheel and the right wheel.

In some implementations, determining that the engine torque indicator is above the pre-determined engine threshold includes at least one of: determining, by a throttle valve position sensor, a throttle position value; determining, by an engine control module, an engine torque output; and determining, by a pedal position sensor, a pedal position value.

In some implementations, determining that at least one of the left and right wheels is slipping includes determining that an effective speed differential between the left wheel and the right wheel is above a pre-determined speed threshold; and in response to the effective speed differential being above the pre-determined speed threshold, causing the ABS module to perform brake traction control on the at least one of the left wheel and the right wheel.

In some implementations, causing the ABS module of the vehicle to perform brake traction control includes determining an effective speed differential between the left wheel and the right wheel; determining a steering angle by a position sensor operatively connected to a steering assembly of the vehicle; and based on the effective speed differential and the steering angle, controlling a pressure applied to the at least one of the left wheel and the right wheel by the ABS module performing brake traction control on the at least one of the left wheel and the right wheel.

In some implementations, determining the effective speed differential includes determining a speed of rotation of the left wheel; determining a speed of rotation of the right wheel; and determining a speed of travel of the vehicle.

In some implementations, causing the ABS module of the vehicle to perform brake traction control includes determining that a locking differential is in an unlocked differential mode, the locking differential being connected between the left driven wheel and the right driven wheel, the locking differential being selectively changeable between a locked differential mode and the unlocked differential mode; and in response to the locking differential being in the unlocked differential mode, further causing the ABS module to perform brake traction control on at least one of the left driven wheel and the right driven wheel.

For purposes of this application, terms related to spatial orientation such as forwardly, rearward, upwardly, downwardly, left, and right, are as they would normally be understood by a driver of the vehicle sitting thereon in a normal riding position.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to four-wheel, off-road vehicles, both a vehicle having two side-by-side seats and a steering wheel (i.e. a side-by-side vehicle (SSV)) and a vehicle having a handlebar and a straddle seat (i.e. an all-terrain vehicle (ATV)). However, it is contemplated that at least some aspects of the present technology may apply to other types of vehicles such as, but not limited to, off-road vehicles having more than four wheels, and on-road vehicles having four or more wheels and having one or more seats.

Figure 1:
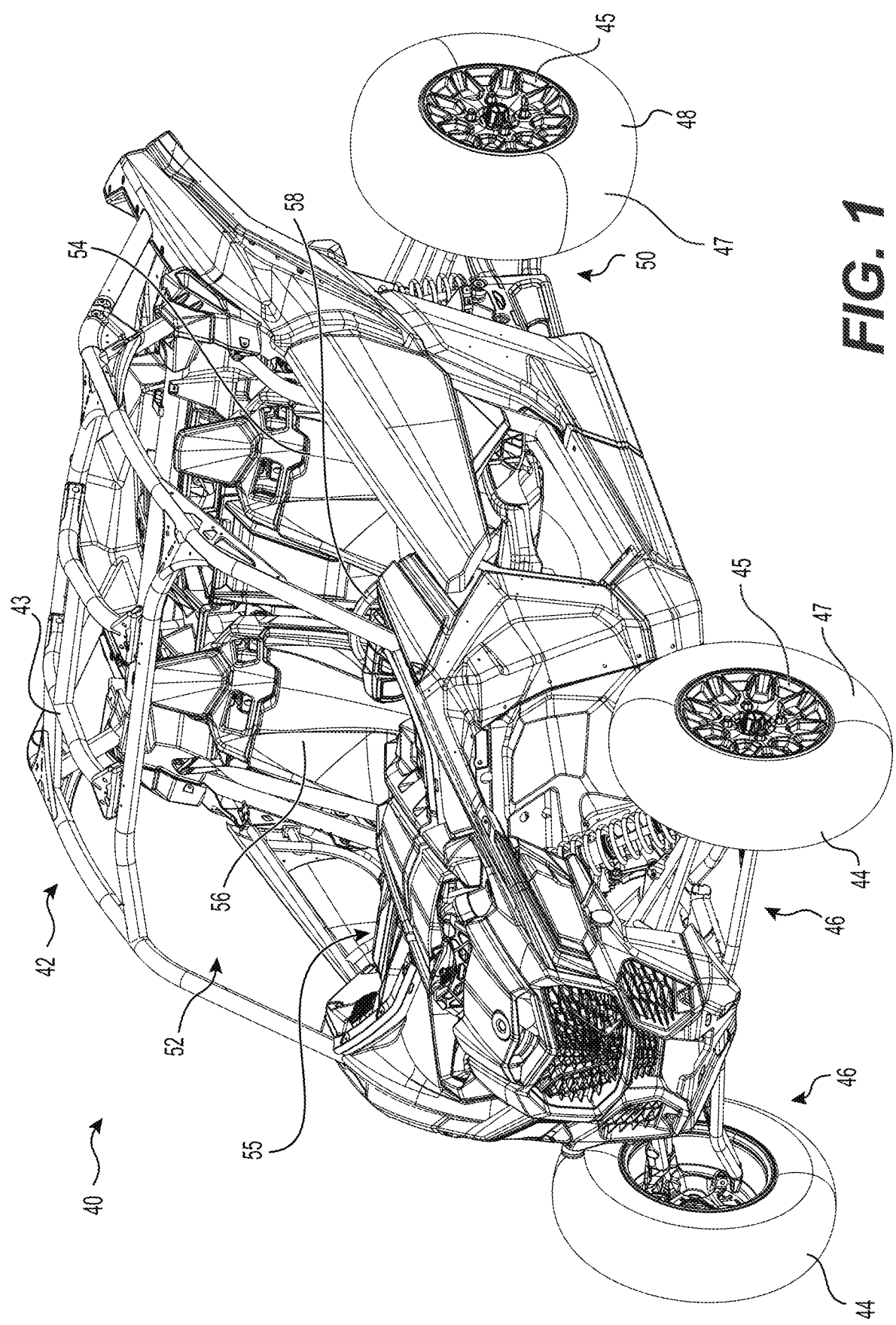
FIG. 1 is a top, front, left side perspective view of a side-by-side vehicle.

The general features of an off-road vehicle 40, specifically a side-by-side vehicle (SSV) 40, will be described with respect to FIGS. 1 and 2. The vehicle 40 has a frame 42. The frame 42 defines a central cockpit area 52 inside which are disposed a driver seat 54 and a passenger seat 56. In the present implementation, the driver seat 54 is disposed on the left side of the vehicle 40 and the passenger seat 56 is disposed on the right side of the vehicle 40. However, it is contemplated that the driver seat 54 could be disposed on the right side of the vehicle 40 and that the passenger seat 56 could be disposed on the left side of the vehicle 40. It is also contemplated that the vehicle 40 could include a single seat for the driver, or a larger number of seats, or a bench accommodating the driver and at least one passenger. The vehicle 40 also includes a roll cage 43 connected to the frame 42 and extending at least partially over the seats 54, 56.

The vehicle 40 includes left and right front wheels 44 connected to the frame 42 by a pair of front suspension assemblies 46. Left and right rear wheels 48 are connected to the frame 42 by a pair of rear suspension assemblies 50. Each one of the front and rear wheels 44, 48 has a rim 45 and a tire 47. The rims 45 and tires 47 of the front wheels 44 may differ in size from the rims and tires of the rear wheels 48.

The vehicle 40 includes a steering wheel 58 operatively connected to the front wheels 44 for controlling an angle of the front wheels 44. The driver operates the steering wheel 58 from the driver seat 54. The steering wheel 58 is disposed in front of the driver seat 54. A steering position sensor 158 is operatively connected to the steering wheel 58, via a steering assembly, for determining a steering angle of the front wheels 44. The vehicle 40 also includes a dashboard 55 disposed forward of the seats 54, 56. A throttle operator in the form of a throttle pedal 91 is disposed over the floor of the cockpit area 52 below the steering wheel 58 and in front of the driver seat 54. A pedal position sensor 93 is operatively connected to the throttle pedal 91 to sense movement of the pedal 91 caused by the driver in operation.

Figure 2:
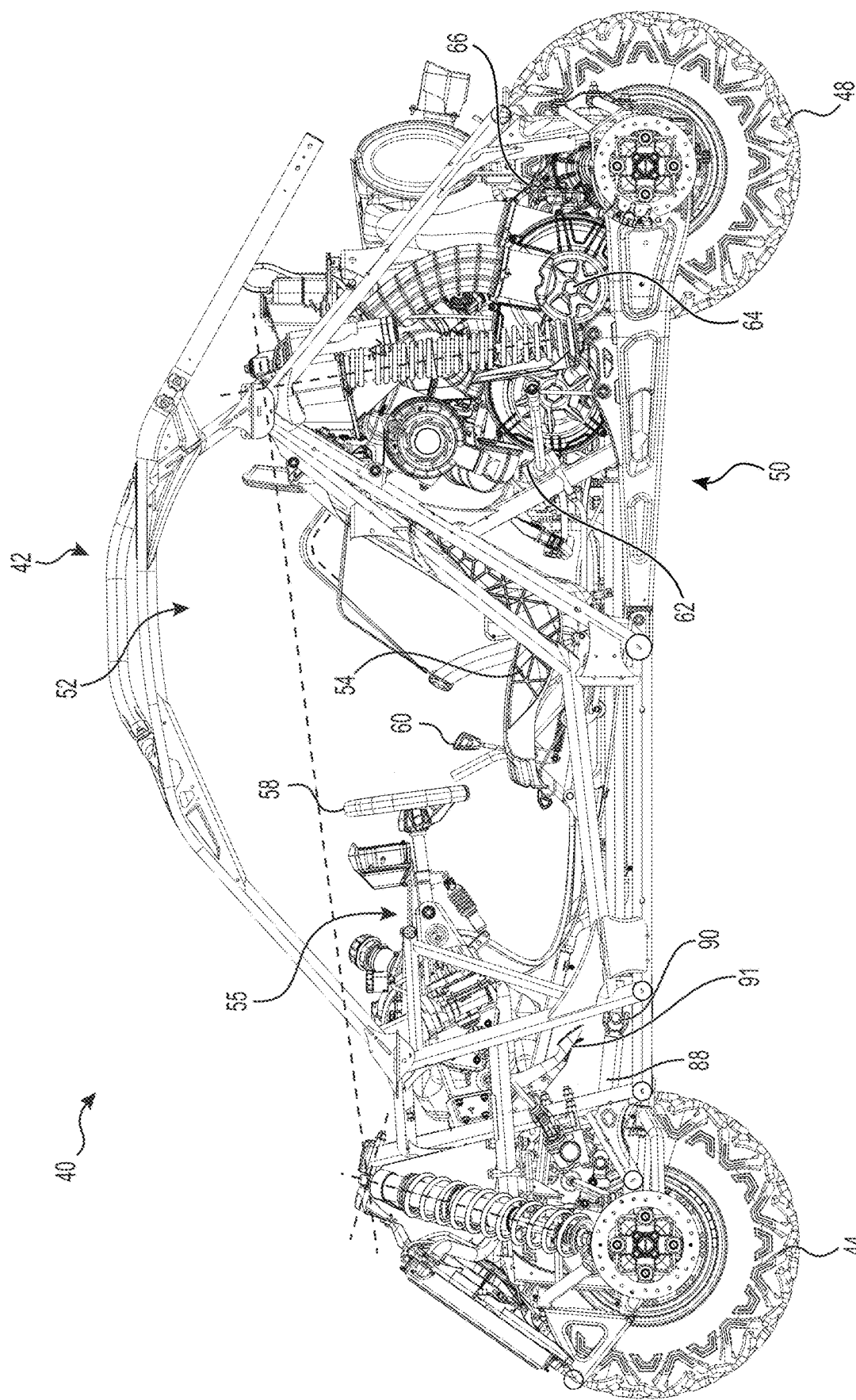
FIG. 2 is a left side elevation view of portions of the vehicle of FIG. 1.

As can be seen in FIG. 2, a motor 62 is connected to the frame 42 in a rear portion of the vehicle 40. In the present implementation, the motor 62 is an internal combustion engine but the present technology is not so limited. It is contemplated that the engine 62 could be replaced by a hybrid or electric motor in some implementations. The vehicle 40 includes an engine control module (ECM) 162 (FIG. 5) for monitoring and controlling various operations of the engine 62. The ECM 162 is communicatively connected to the pedal position sensor 93 for receiving signals for controlling a throttle valve (not shown) of the engine 62. The engine 62 further includes a throttle position sensor 164 (FIG. 5) operatively connected to the throttle valve and communicatively connected to the ECM 162 for monitoring the position of the throttle valve.

Figure 3:
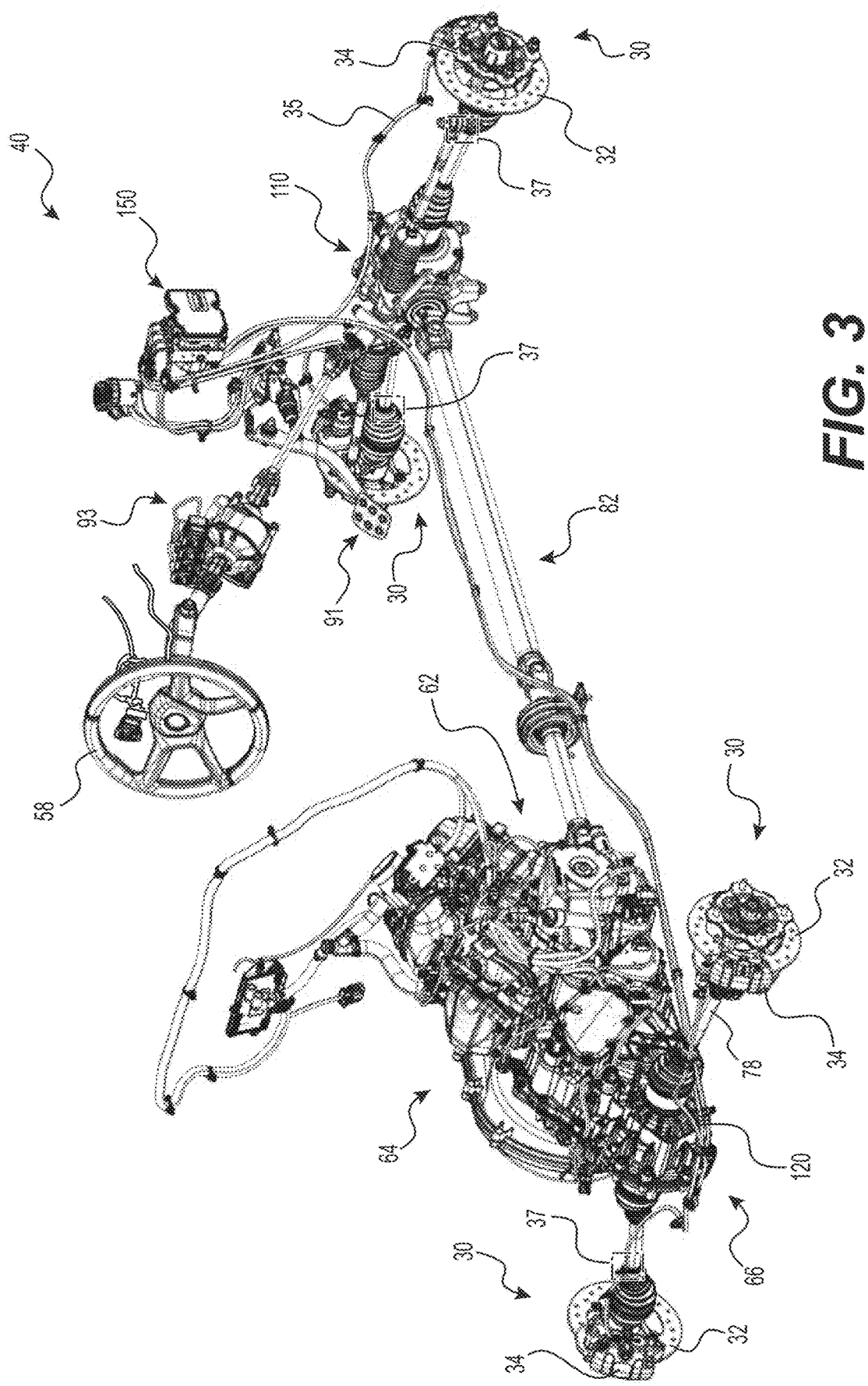
FIG. 3 is a top, rear, right side perspective view of a motor, driveshafts, brake assemblies, and steering assembly of the vehicle of FIG. 1.
Figure 4:
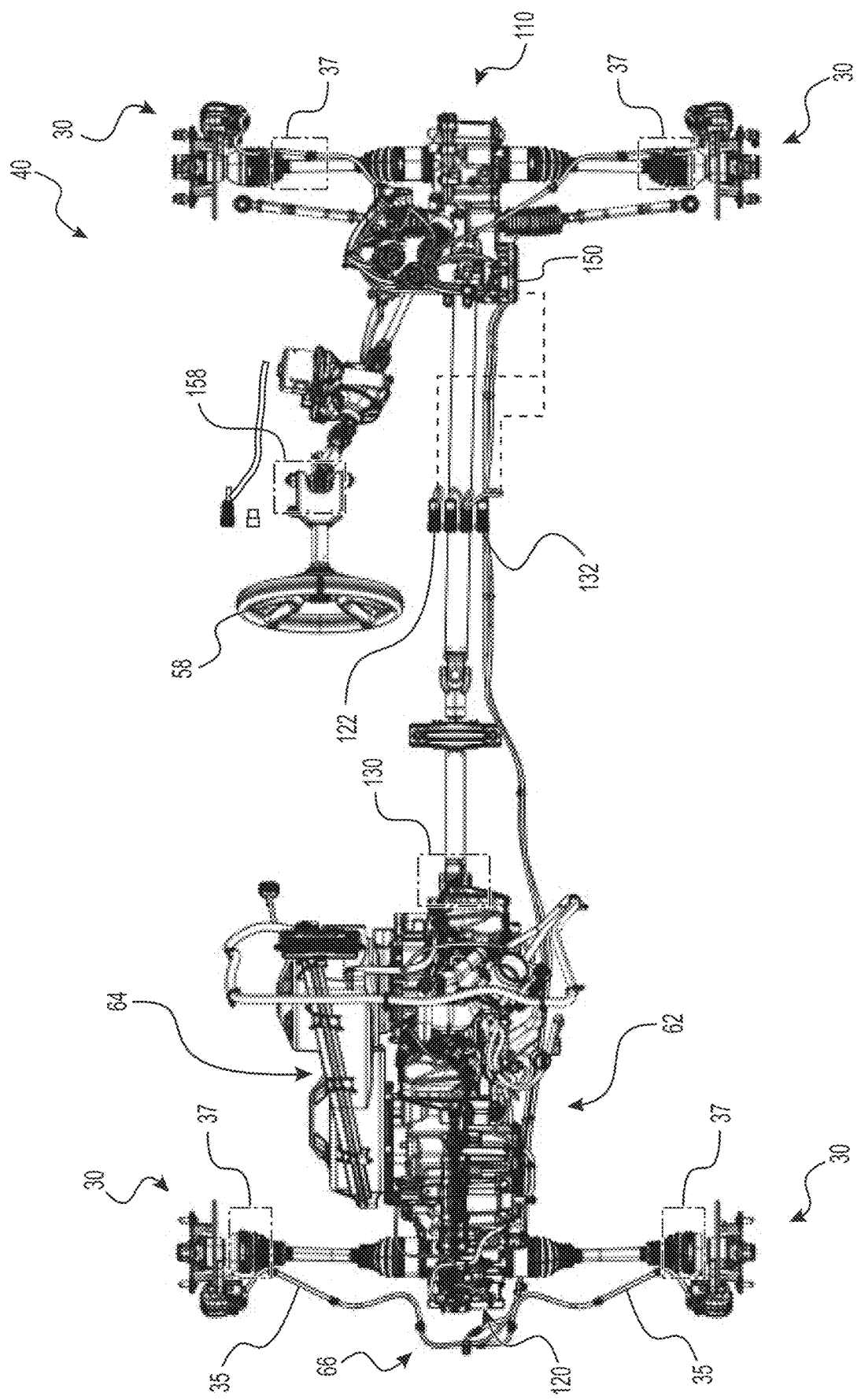
FIG. 4 is a top plan view of the components of FIG. 3.
Figure 5:
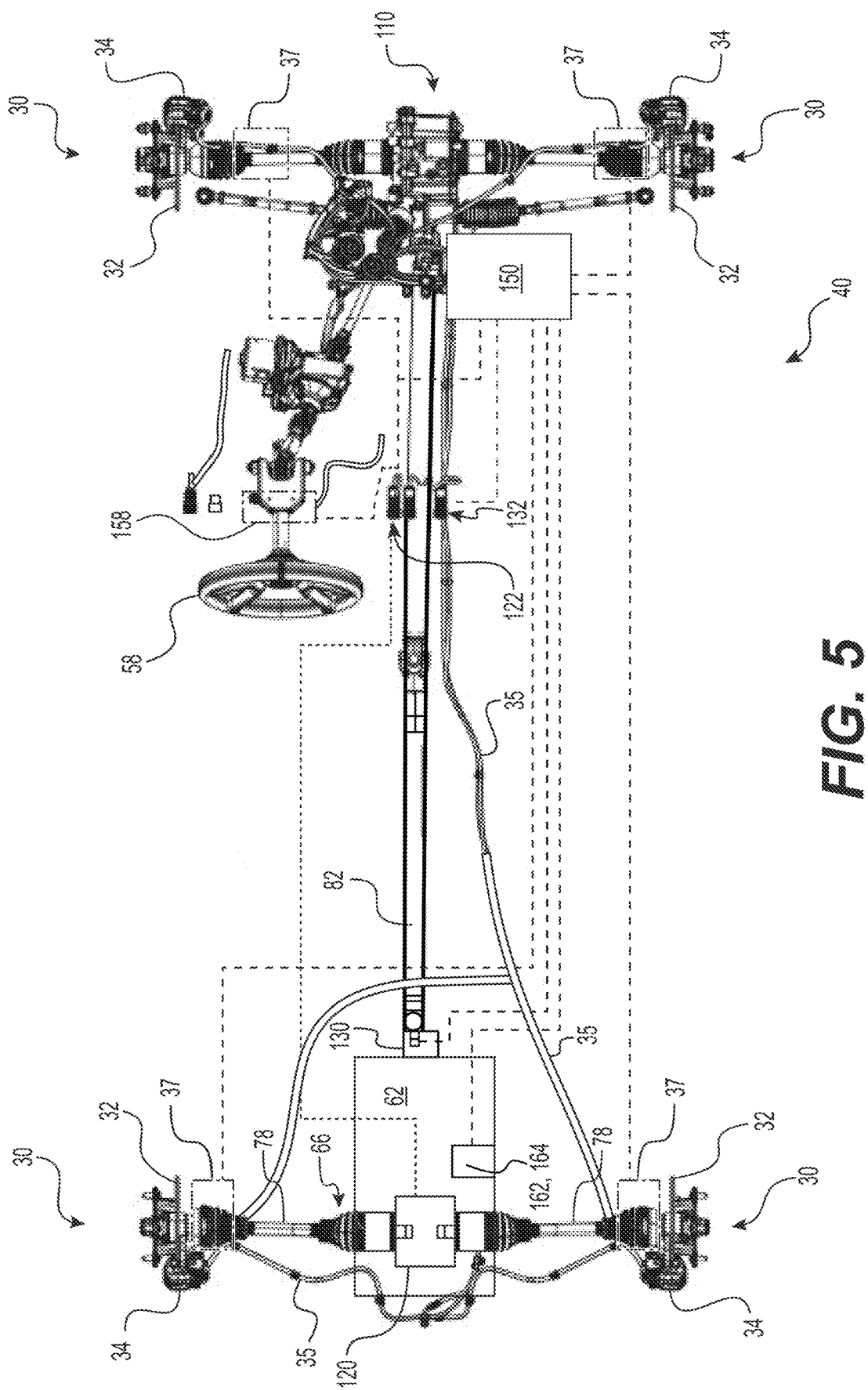
FIG. 5 is a top plan view of the components of FIG. 3 with schematic illustration of a control system of the vehicle of FIG. 1 and with the motor having been removed.

With further reference to FIGS. 3 to 5, the vehicle 40 includes four brake assemblies 30. One brake assembly 30 is operatively connected to each of the wheels 44, 48. Each brake assembly 30 includes a brake disc 32 and a caliper 34 disposed around its corresponding brake disc 32. Each caliper 34 is connected to a corresponding brake line 35. The brake lines 35 are operatively connected to a brake pedal (not shown) of the vehicle 40. The brake lines 35 are further connected to an anti-lock braking system (ABS) module 150, which will be described in more detail below. Each caliper 34 includes a pair of brake pads positioned on opposite sides of its respective brake disc 32. The brake assemblies 30 are actuated by actuating the calipers 34 by application of a fluid pressure in the brake lines 35, thereby causing the brake pads to apply pressure on their respective brake discs 32.

The motor 62 is connected to a transmission 64, specifically a continuously variable transmission (CVT) 64 disposed on a left side of the motor 62. The CVT 64 is operatively connected to a transaxle 66 to transmit torque from the motor 62 to the transaxle. The transaxle 66 is operatively connected to the front and rear wheels 44, 48 to propel the vehicle 40. The motor 62 and the transmission 64 are supported by the frame 42. Variants of the vehicle 40 having other transmission types are contemplated.

The transaxle 66 is mechanically connected to a shifter 60 disposed laterally between the two seats 54, 56. The shifter 60 allows the driver to select from a plurality of combinations of engagement of gears of the transaxle, commonly referred to as gears. In the present implementation, the shifter 60 allows the driver to select between a reverse gear, two forward gears (high and low) and a neutral position in which the transaxle does not transmit torque to the wheels 44, 48. It is contemplated that other types of connections between the shifter 60 and the transaxle 66 could be used.

The transaxle 66 transmits the torque applied thereon to drive the left and right rear wheels 48. While the vehicle 40 is described with the rear wheels 48 driving the vehicle 40 when in 2×4 drive mode, it is contemplated that the front wheels 44 could be driven when the vehicle 40 is in 2×4 drive mode in some implementations. Specifically, the transaxle 66 includes left and right half-shafts 78 and a differential 120 connected therebetween for applying torque to the rear driven wheels 48. The differential is operatively connected between the transmission 64 and the left and right driven wheels 48.

The differential 120 is a locking differential 120 changeable between a locked differential mode and an unlocked differential mode. The locked differential mode locks the rotation of the wheels 48 to the same rate of rotation, while the unlocked mode allows the wheels 48 to rotate independently (similarly to an open differential).

The vehicle 40 also includes a differential switch 122 provided in the vicinity of a driver in the vehicle 40. In the present implementation, the switch 122 is disposed on the dashboard 55. The differential switch 122 is a toggle switch 122 having two (2) positions: a locked mode position for manually locking the differential 120 and an unlocked mode position for unlocking the differential 120. The differential 120 includes a controller (not separately numbered) communicatively connected to the differential switch 122. The controller selectively changes the differential 120 to the locked differential mode or the unlocked differential mode when the differential switch 122 is moved to the locked mode position or the unlocked mode position, respectively. In some implementations, the differential switch 122 could be connected to the ECM 162 and the ECM 162 could control the mode of the differential 120.

In some implementations, the differential switch 122 could be omitted and control systems of the vehicle 40 could automatically control the locking and unlocking of the differential 120. It is also contemplated that the control systems of the vehicle 40 could automatically control the locking and unlocking of the differential 120 in addition to control of the differential 120 with the differential switch 122.

In the present technology, the transmission 64 is selectively connected to the front wheels 44 via a drive mode coupler 130, shown schematically in FIG. 4. The drive mode coupler 130 causes the vehicle 40 to change from a 2×4 drive configuration to a 4×4 drive configuration by selectively coupling the front left and right wheels 44 to the transmission 64 for selectively driving the front wheels 44.

When the drive mode coupler 130 selectively couples the front left and right wheels 44 to the transmission 64, the torque is transferred from the motor 62 to a series of driveshafts 82, in addition to applying a portion of the torque on the rear half shafts 78. A front end of the series of driveshaft 82 is connected to a differential 110. The differential 110 is operatively connected between the left and right front wheels 44 via left and right half-shafts 77. The differential 110 is an open differential 110, allowing the wheels 44 to rotate independently.

The selection between the 2×4 drive configuration and the 4×4 drive configuration is made using a drive mode switch 132 provided in the vicinity of the driver in the vehicle 40. The drive mode switch 132 is connected to the EM 162, which is connected to an actuator for moving the drive mode coupler 130. As such, the drive mode switch 132 is operatively connected to the drive mode coupler 130 for selectively controlling the drive mode coupler 130. The drive mode switch 132 is a toggle switch 132 mounted on the dashboard 55 of the vehicle 40 (shown isolated from the dashboard 55 in FIG. 4), next to the differential switch 122. The switch 132 has two (2) positions: a 2×4 position for selecting the 2×4 drive configuration and a 4×4 position for selecting the 2×4 drive configuration. It is contemplated that the switches 122, 132 could be different types of control mechanisms, including for example rotary knobs or press buttons. It is contemplated that the switches 122, 132 could be differently located in the vehicle 40, for example on the steering wheel 58. It is further contemplated that the vehicle 40 could include additional switches for selecting addition modes of vehicle control, for example a mud mode, a sand mode, a snow mode, and the like. In some implementations, the additional switch could be combined with the drive mode switch 132 in order to only be activated when the drive mode switch 132 is in the 4×4 drive mode.

As indicated above, the vehicle 40 includes an anti-lock braking system (ABS) module 150 for selectively controlling the brake assemblies 30. The vehicle 40 includes four speed sensors 37, one sensor 37 operatively connected to each of the wheels 44, 48. Each speed sensor 37 is communicatively connected to the ABS module 150. In some implementations, the two rear wheel speed sensors 37 could be replaced by one speed sensor 37 to monitor the speed of the trans axle 66. The ABS module 150 is further communicatively connected to the drive mode switch 132, the differential switch 122, steering position sensor 158, the pedal position sensor 93, the throttle position sensor 164, and the ECM 162 for receiving information therefrom, and where applicable, sending information thereto.

The operation of the ABS, by the ABS module 150, will now be briefly described. During operation, the ABS uses wheel speed signals received by the ABS module 150 from the wheel speed sensors 37 (schematically illustrated in FIG. 4) that detect the speed of rotations of the wheels 44, 48. The ABS module 150 detects the onset of locking of one of the brake assemblies 30 when one of the wheel speed sensors 37 reports a significantly lower wheel speed than the other speed sensors 37. When this happens, the ABS module 150 causes a valve (not shown) connected to the brake assembly 30 that is locked or about to become locked to modulate the pressure applied by the corresponding caliper 34 on the disc 32, by repeatedly closing and opening the valve to repeatedly reduce or release and then re-apply brake pressure in the corresponding brake line 35 until the wheel 44, 48 connected to the brake assembly 30 that was locked or about to become locked rotates again at about the same speed as the other wheels 44, 48. As such, the ABS module 150 controls operation of the valves by opening and closing them cyclically for preventing locking of the brake assemblies 30. It is contemplated that this control could be applied to two or more of the brake assemblies 30 at the same time.

In the present technology, the ABS module 150 is further adapted to perform brake traction control (BTC) of the wheels 44. The BTC is activated based on the position of the drive mode switch 132, as will be described in more detail below. In some implementations, the ABS module 150 is also adapted to perform BTC on the rear wheels 48 based on the position of the drive mode switch 132.

BTC performed by the ABS module 150 will first be described in general terms. BTC, having been activated based on the position of the drive mode switch 132, starts acting when one of the speed sensors 37 reports a significantly higher speed than the other speed sensors 37, indicating that a corresponding wheel 44, 48 is slipping. In response, the ABS module 150 causes brake pressure to be applied to the brake assembly 30 that corresponds to the slipping wheel 44, 48 by opening the corresponding valve (similarly to the anti-lock braking described above). As in the case of ABS operation, the ABS module 150 may modulate the brake pressure applied to the brake assembly 30 of the slipping wheel 44, 48, by repeatedly closing and opening the valve to repeatedly reduce or release and then re-apply brake pressure in the corresponding brake line 35 until the wheel 44, 48 that was slipping gains traction and starts rotating again at about the same speed as its paired wheel 44, 48. Specifically, by blocking movement of the slipping wheel 44, 48, torque that was directed by the corresponding differential 110, 120 (because the slipping wheel 44, 48 was the path of least resistance) is instead transferred to the oppositely arranged wheel 44, 48 (which is the least of least resistance when the slipping wheel 44, 48 is blocked by the brake assembly 30).

According to the present technology, the ABS module 150 selectively performs BTC based on the position of the drive mode switch 132. Specifically, the ABS module 150 senses the position of the drive mode switch 132 and then selectively activates BTC on the front wheels 44 only when the drive mode switch 132 is in the 4×4 position. After having been activated based on the switch position and upon detecting loss of traction of one of the front wheels 44, the ABS module 150 will control the corresponding brake assembly 30 to transfer power to the opposite wheel 44.

When the ABS module 150 senses that the drive mode switch 132 is in the 2×4 position, however, no BTC is performed on the front wheels 44. In the present implementation, the ABS module 150 also performs no BTC on the rear driven wheels 48 when the drive mode switch 132 is in the 2×4 position. It is contemplated, however, that the ABS module 150 could be adapted for performing BTC on the rear driven wheels 48 when the drive mode switch 132 is in the 2×4 position and the differential 120 is in the unlocked position.

In order to determine when to initiate controlling the brake assemblies 30 as described generally above, the ABS module 150 receives information from the speed sensors 37, the steering position sensor 158, the pedal position sensor 93, the throttle position sensor 164, and the ECM 162. In some implementations, in addition to information from the speed sensors 37, the ABS module 150 could receive information from only one or more of the pedal position sensor 93, the steering position sensor 158, the throttle position sensor 164, and the ECM 162. It is contemplated, for example, that the pedal position sensor 93 and/or the throttle position sensor 164 could be omitted in some implementations.

Figure 6:
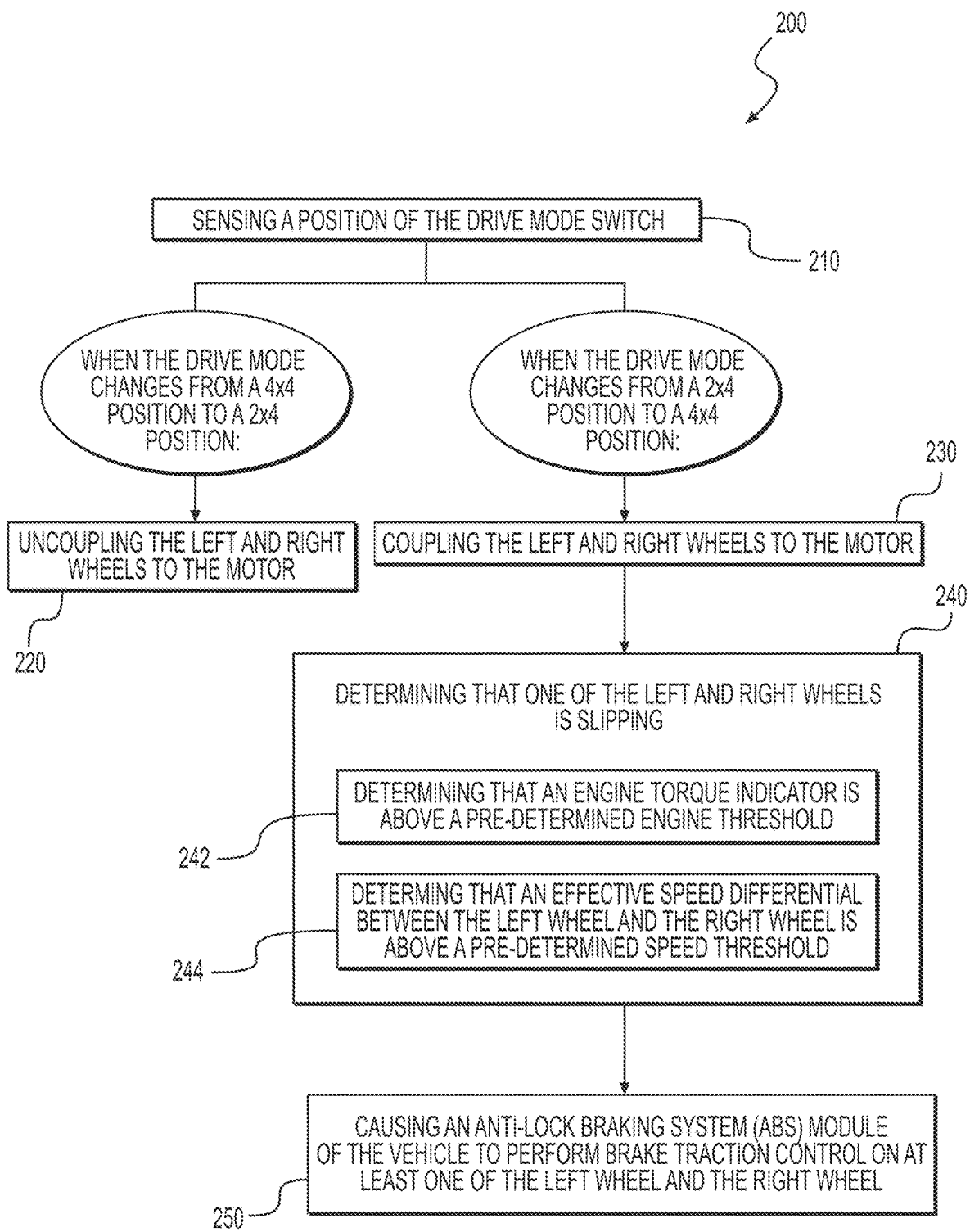
FIG. 6 is a flow chart illustrating a method for controlling traction of the vehicle of FIG. 1.
Figure 7:
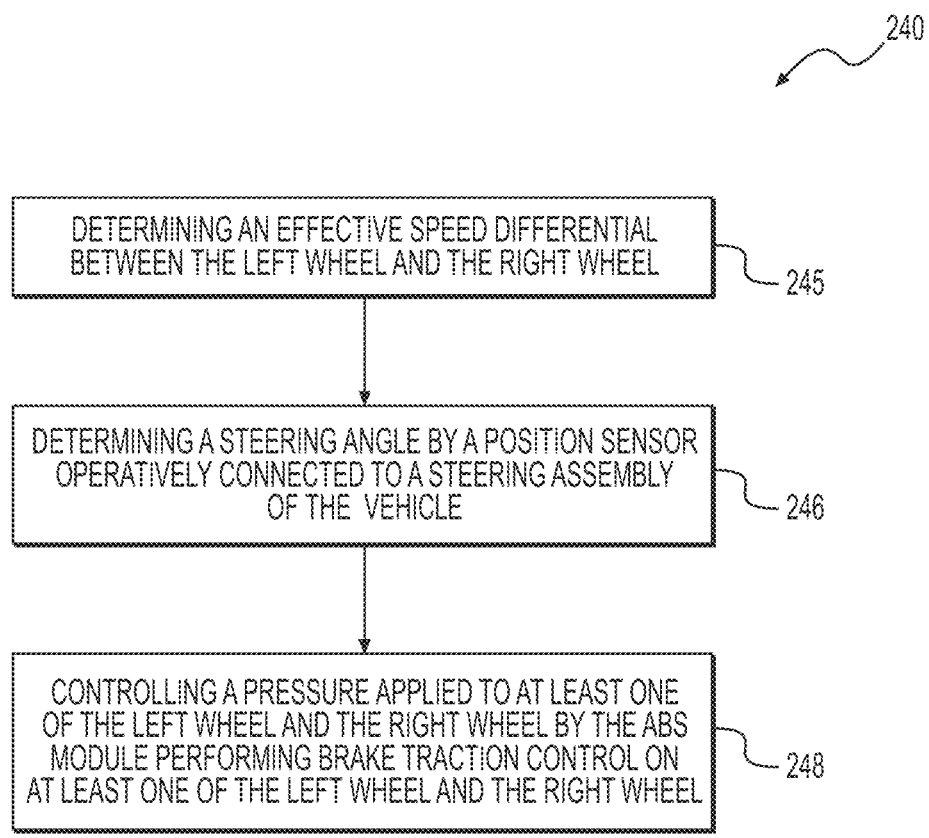
FIG. 7 is a flow chart illustrating additional portions of the method of FIG. 6.

With further reference to FIGS. 6 and 7, controlling traction of the vehicle 40 using BTC according to the present technology will now be described in terms of a method 200. While the method 200 will be described as being performed by the ABS module 150, it is contemplated that the method 200 could be carried out by another computer-implemented controller in communication with the ABS module 150, including but not limited to the ECM 162. It is also contemplated that different portions of the method 200 could be performed by different computer-implemented controllers of the vehicle 40.

The method 200 begins at step 210 with sensing the position of the drive mode switch 132 by the ABS module 150. As is described above, the ABS module 150 only performs BTC on the wheels 44, 48 when the drive mode switch 132 is in the 4×4 position.

When it is sensed that the drive mode switch 132 changes from the 4×4 position to the 2×4 position at step 210, the method 200 continues at step 220 with uncoupling the front wheels 44 from the motor 62 by sending a message to the drive mode coupler 130. Following step 220, the method 200 terminates. The method 200 will then start again when the position of the drive mode switch 132 is changes from the 2×4 position to the 4×4 position and the method 200 senses the position of the drive mode switch 132 once again at step 210.

When the method 200 determines at step 210 that the drive mode switch 132 changes from the 2×4 position to the 4×4 position, the method 200 continues at step 230 with coupling the front wheels 44 to the motor 62 by sending a message to the drive mode coupler 130.

The vehicle 40 now being in the 4×4 drive configuration, the method 200 then continues at step 240 with determining that one of the wheels 44 has begun slipping, or loosing traction. Specifically the ABS module 150 begins monitoring the slippage of the wheels 44 at step 240. It should be noted that the ABS module 150 may not act on the brake assemblies 30 immediately following step 230; the vehicle 40 could have full traction on both of the wheels 40 and not require brake manipulation.

The method 200 then continues at step 250 with causing the ABS module 150 to perform BTC on at least one of the front wheels 44, slippage of one of the wheels 44 having been detected at step 240. The method 200 generally continues with steps 240 and 250, with the ABS module 150 providing BTC to the front wheels 44 when slippage is detected, until the ABS module 150 determines that the drive mode switch 132 has changed position.

Determining that the wheel 44 is slipping by the ABS module 150 at step 240 includes determining, at sub-step 242, that an engine torque indicator is above a pre-determined engine threshold. The pre-determined engine threshold of the engine torque indicator provides confirmation to the ABS module 150 that torque is being solicited from the engine 62 and that the wheels 44, 48 are generally meant to be propelling the vehicle 40. It is contemplated that determining that the engine torque indicator is above the pre-determined threshold could similarly determine that a much higher engine torque is being requested than corresponds to the actual travel speed of the vehicle 40, in connection with the speed sensors 37 and/or another method of determining travel speed of the vehicle 40.

The engine torque indicator can be one or more of throttle position value of the throttle valve, an engine torque output, and pedal position value. Thus determining that the engine torque indicator is above the pre-determined threshold can include one or more of determining the throttle position value by the throttle valve position sensor 164, determining the engine torque output by the ECM 162, and determining the pedal position value by the pedal position sensor 93. It is contemplated that different measures of engine torque could be used in determining the engine torque indicator.

As is briefly described above, when one of the speed sensors 37 indicates a significantly higher speed than the other speed sensors 37, this generally indicates that its corresponding wheel 44 is slipping. As the relative speed between the wheels 44 can vary for reasons other than loss of traction, an effective speed differential can be compared to a pre-determined speed threshold. The pre-determined speed threshold provides a limit above which the speed differential will likely indicate wheel slippage. Determining that one of the wheels 44 is slipping at step 240 also includes determining, at sub-step 244, that an effective speed differential between the front wheels 44 is above a pre-determined speed threshold. The effective speed differential is found by determining speed of each wheel 44 is measured by its corresponding speed sensor 37, and the ABS module 150 determines the speed differential based on the information received from the speed sensors 37.

The method 200 further includes determining the speed of travel of the vehicle 40. As a small speed differential between the wheels 44 is more likely to indicate slippage at low travel speeds of the vehicle 40 than the same numerical speed differential at a higher travel speeds, the measured speed differential is further compared to the travel speed of the vehicle 40 to determine an effective speed differential. If the effective speed differential exceeds the pre-determined threshold, the ABS module 150 then acts on the brake assemblies 30 to perform BTC as described above.

In some implementations, the steering angle as measured by the steering position sensor 158 could be taken into consideration for determining the effective speed differential. When the vehicle 40 is turning, the wheels 44 will generally have different rotational speeds and the absolute speed differential between the two wheels 44 depends on not only the travel speed of the vehicle 40, but also the steering angle of the wheels 44. In order to determine if a speed differential is due to turning or slipping, the steering angle as measured by the steering position sensor 158 could thus be taken into consideration for determining the effective speed differential.

The method 200 then continues at step 250 with causing the ABS module 150 to perform BTC on at least one of the front wheels 44, slippage of one of the wheels 44 having been detected at step 240. The method 200 generally continues with steps 240 and 250, with the ABS module 150 providing BTC to the front wheels 44 when slippage is detected, until the ABS module 150 determines that the drive mode switch 132 has changed position.

In some implementations, the method 200 continues with determining the pressure that should be applied to the brake assembly 30 of the wheel 44 that is slipping. In such a case, causing the ABS module 150 to perform BTC includes at sub-step 245 determining the effective speed differential. The sub-step 245 is performed generally as described above in reference to sub-step 244 and will not be described again. It is contemplated that determining the effective speed differential at sub-step 245 could include different, fewer, or additional factors in the speed differential calculation. Then at sub-step 246, the steering angle is determined by the steering position sensor 158 operatively connected to the steering wheel 58. Based on the effective speed differential and the steering angle, the method 200 continues at sub-step 248 with controlling the pressure applied to the slipping wheel 44 by the ABS module 150 performing BTC.

In some implementations, causing the ABS module 150 to perform BTC at step 250 further includes determining that the differential 120 is in the unlocked differential mode. In response, the method 200 further includes causing the ABS module 150 to perform BTC on the rear wheels 48. As is mentioned above, in some implementations, the ABS module 150 could perform BTC on the rear wheels 48 when the differential 120 is in the unlocked differential mode and the drive mode switch 132 is in the 2×4 position in a manner similar to the way BTC is performed on the front wheels 44 as described above.

It is contemplated that the method 200 could include additional or different steps, either to perform additional functions and/or to perform the steps described above. It is contemplated that the steps 242 and 244 could be performed in either order or simultaneously and is not limited to the order set forth in the explanation above. Similarly, it is contemplated that the steps 244 and 246 could be performed in either order or simultaneously and is not limited to the order set forth in the explanation above.

Figure 8:
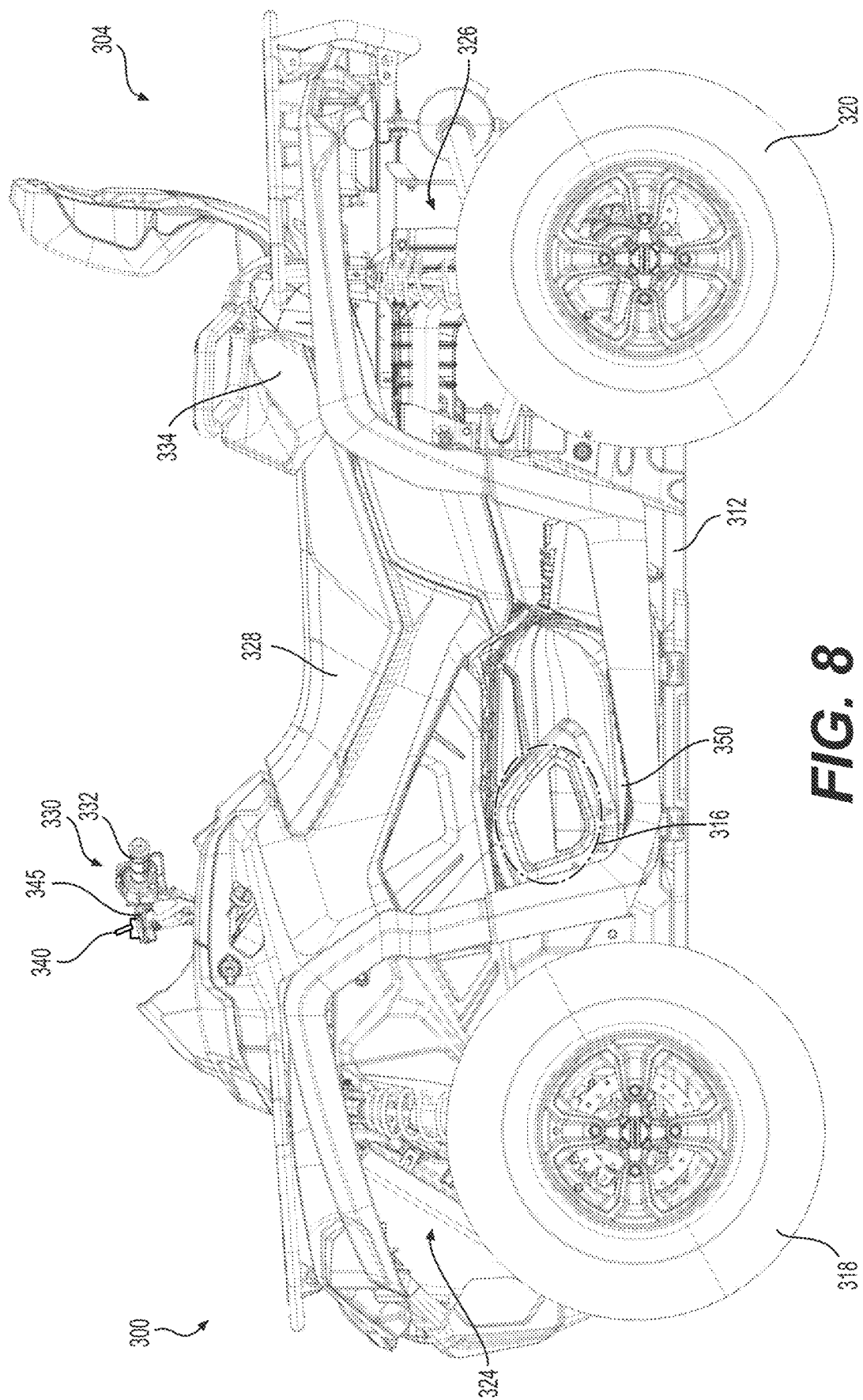
FIG. 8 is a left side elevation view of an all-terrain vehicle.
Figure 9:
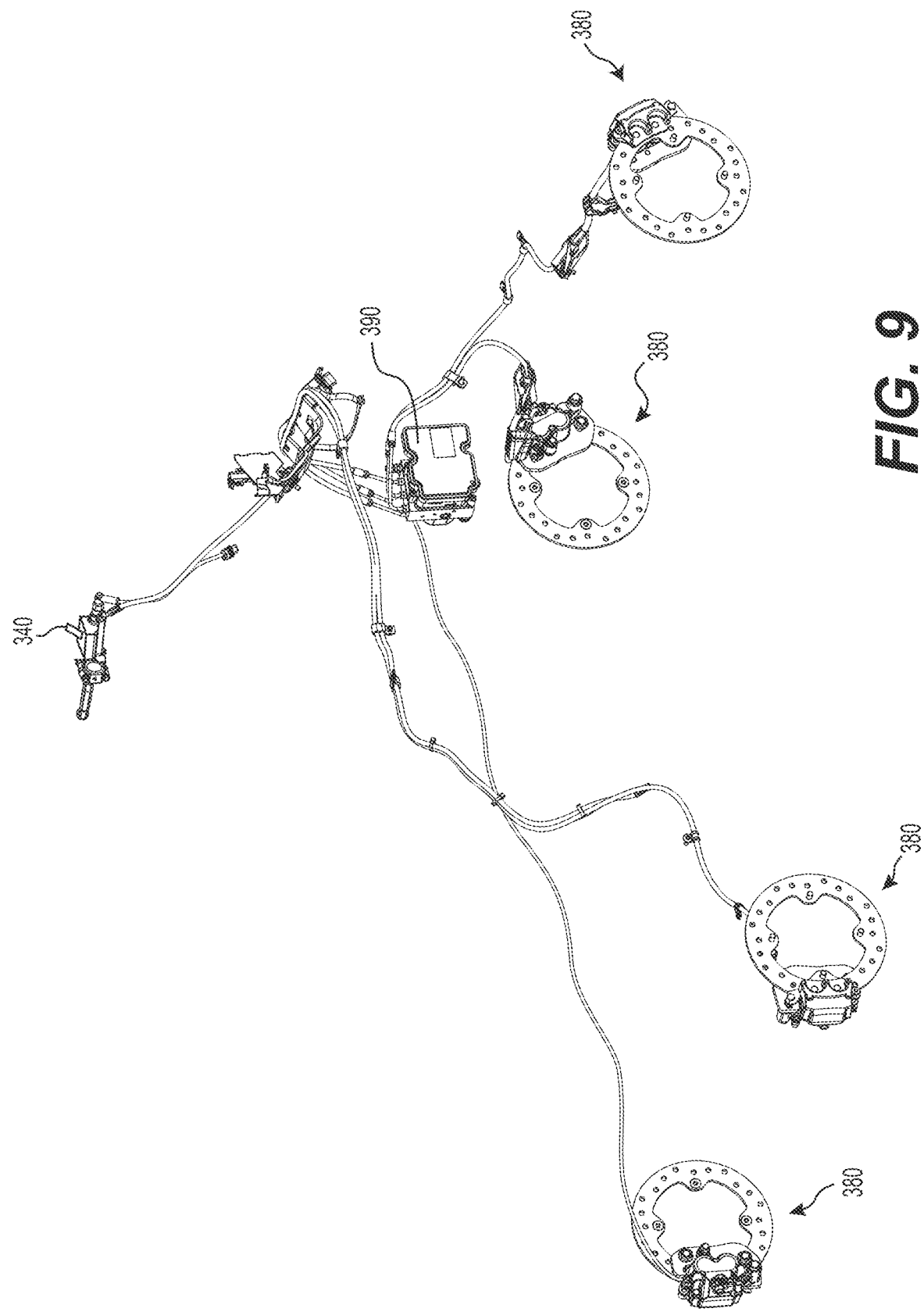
FIG. 9 is a schematic representation of portions of the vehicle of FIG. 8.

The present technology, described above with respect to the side-by-side vehicle 40, is similarly applicable to straddle-type all-terrain vehicles. With reference to FIGS. 8 and 9, a straddle-type all-terrain vehicle (ATV) 300 will now be briefly described. Elements of the present technology as it applies to the ATV 300 that are similar to those of the SSV 40 will generally not be described again herein.

The ATV 300 has a front end 302 and a rear end 304 defined consistently with a forward travel direction of the ATV 300. The ATV 300 has a frame 312 to which is mounted a motor 316 for powering the ATV 300, specifically an internal combustion engine 316 in the present implementation. It is contemplated that the ATV 300 may be powered by other types of motors, being for example powered by an electric motor.

The ATV 300 has two front wheels 318 and two rear wheels 320. The two front wheels 318 are suspended from the frame 312 by respective front suspension assemblies 324. Similarly, the two rear wheels 320 are suspended from the frame 312 by respective rear suspension assemblies 326. Each wheel 318, 320 includes a brake assembly 380, as is illustrated in FIG. 9. The brake assemblies 380 are similar to the brake assemblies 30 of the SSV vehicle 40, but it is contemplated that different types of brake assemblies could be used depending on the implementation.

The ATV 300 further includes a straddle seat 328 mounted to the frame 312 for accommodating a driver of the ATV 300. Driver footrests 350 are provided on either of the driver seat 328 and are disposed vertically lower than the driver seat 328 to support the driver's feet. Another straddle seat 334 is provided behind the driver seat 328 to accommodate a passenger. It is contemplated that the ATV 300 could include on the driver seat 328 in some implementations.

A steering assembly 330, including a handlebar 332, is rotationally supported by the frame 312 to enable a driver to steer the ATV 300. The steering assembly 330 is operably connected to the front left and right wheels 18, through a steering column (not shown) in order to steer and turn the ATV 300.

Similarly to the SSV vehicle 40 described above, the ATV 300 can be operated in the 2×4 drive configuration or in the 4×4 drive configuration. In the 2×4 drive configuration, the rear wheels 320 are driven by the engine 316. In the 4×4 drive configuration, both the front wheels 318 and the rear wheels 320 are driven. The ATV 300 includes a drive mode coupler (not shown) operatively connected between the engine 316 and the front wheels 318. The drive mode coupler selectively couples the transmission (not shown) and the front wheels 318 for selectively driving the front wheels 318 in addition to the rear wheels 320. The drive mode coupler is controlled by a manual drive mode switch 340 disposed on the handlebar 332. The ATV 300 also includes a differential switch 345 for selectively controlling a locking differential (not shown) connected between the front wheels 318. As described above with respect to the switch 122, the switch 345 is a manual switch 345 disposed on the handlebar 332, which allows a rider to switch between locked and unlocked modes of the differential.

The ATV 300 also includes an ABS module 390 operatively connected to each brake assembly 380. The ABS module 390 operates generally same as the ABS module 150 and performs the method 200 for the ATV 300, mutatis mutandis. The ABS module 390 is communicatively connected to the drive mode switch 340 on the handlebar 330 in order to determine the position of the switch 340. As described above for the vehicle 40, the ABS module 390 selectively performs BTC based on the position of the drive mode switch 340. The ABS module 390 selectively performs BTC on the front wheels 318 when the drive mode switch 340 is in the 4×4 position.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
a motor connected to the frame;
a pair of front suspension assemblies connected to the frame;
a pair of rear suspension assemblies connected to the frame;
a left driven wheel and a right driven wheel connected to one of the pair of front suspension assemblies and the pair of rear suspension assemblies;
a first left brake assembly operatively connected to the left driven wheel;
a first right brake assembly operatively connected to the right driven wheel;
a left wheel and a right wheel connected to another one of the pair of front suspension assemblies and the pair of rear suspension assemblies;
a second left brake assembly operatively connected to the left wheel;
a second right brake assembly operatively connected to the right wheel;
an anti-lock braking system (ABS) module for selectively controlling the brake assemblies, the ABS module being communicatively connected to the first left brake assembly, the first right brake assembly, the second left brake assembly, and the second right brake assembly;
a transmission operatively connected to the motor for receiving torque from the motor,
the left and right driven wheels being operatively connected to the transmission;
a drive mode coupler connected between the transmission and the left and right wheels, the drive mode coupler causing the vehicle to change between a 2×4 drive configuration and a 4×4 drive configuration by selectively coupling the transmission and the left and right wheels for selectively driving the left and right wheels;
a drive mode switch operatively connected to the drive mode coupler, a position of the drive mode switch being selectively moveable between a 2×4 position and a 4×4 position, the drive mode switch being communicatively connected to the ABS module,
the drive mode switch causing the drive mode coupler to change to one of the 2×4 drive configuration and the 4×4 drive configuration when the drive mode switch is moved to a corresponding one of the 2×4 position and the 4×4 position,
the ABS module selectively performing brake traction control of at least one of the left wheel and the right wheel based on the position of the drive mode switch; and
a differential operatively connected between the transmission and the left and right driven wheels, the differential being a locking differential changeable between a locked differential mode and an unlocked differential mode.

2. The vehicle of claim 1, wherein the ABS module selectively performs brake traction control of the at least one of the left wheel and the right wheel when the drive mode switch is in the 4×4 position.

3. The vehicle of claim 1, wherein no brake traction control is performed on the at least one of the left wheel and the right wheel when the drive mode switch is in the 2×4 position.

4. The vehicle of claim 1, wherein:
the differential is a first differential; and
further comprising a second differential operatively connected between the left wheel and the right wheel, the second differential being an open differential.

5. The vehicle of claim 1, wherein the vehicle is an all-terrain vehicle (ATV); and
further comprising:
a straddle seat connected to the frame; and
a handlebar operatively connected to one of:
the left and right wheels, and
the left and right driven wheels.

6. The vehicle of claim 1, wherein the ABS module further selectively performs traction control on the left driven wheel and the right driven wheel when the differential is in the unlocked differential mode.

7. The vehicle of claim 6, further comprising a differential switch communicatively connected to a controller communicatively connected to the differential, the controller selectively changing the differential to one of the locked differential mode and the unlocked differential mode when the differential switch is moved to a corresponding one of a locked mode position and an unlocked mode position.

8. The vehicle of claim 7, wherein:
the vehicle is a side-by-side vehicle comprising a dashboard; and
the differential switch is a manual switch disposed on the dashboard.

9. The vehicle of claim 7, wherein:
the vehicle is an all-terrain vehicle comprising a handlebar; and
the differential switch is a manual switch disposed on the handlebar.

10. The vehicle of claim 1, wherein:
the vehicle is a side-by-side vehicle comprising a dashboard; and
the drive mode switch is a manual switch disposed on the dashboard.

11. The vehicle of claim 1, wherein:
the vehicle is an all-terrain vehicle comprising a handlebar; and
the drive mode switch is a manual switch disposed on the handlebar.

12. The vehicle of claim 1, further comprising:
a plurality of speed sensors operatively connected to at least the left and right wheels, the plurality of speed sensors being communicatively connected to the ABS module; and
at least one of:
a throttle position sensor communicatively connected to the ABS module,
a pedal position sensor communicatively connected to the ABS module, and
an engine control module for determining engine torque output communicatively connected to the ABS module.

13. The vehicle of claim 1, wherein the vehicle is a side-by-side vehicle (SSV); and
further comprising:
two seats connected to the frame, the two seats being disposed side by side;
a roll cage connected to the frame and extending at least partially over the two seats; and
a steering wheel operatively connected to one of:
the left and right wheels, and
the left and right driven wheels.

14. A method for controlling traction of a vehicle, the vehicle having:

a motor;
a left driven wheel and a right driven wheel coupled to and driven by the motor, the left and right driven wheels being one of front wheels of the vehicle and rear wheels of the vehicle; and
a left wheel and a right wheel, the left and right wheels being another one of the front wheels and the rear wheels,
the method comprising:
sensing a position of a drive mode switch, the drive mode switch having a 2×4 position and a 4×4 position;
when the drive mode changes from a 2×4 position to a 4×4 position:
coupling the left and right wheels to the motor;
determining that at least one of the left and right wheels is slipping; and
causing an anti-lock braking system (ABS) module of the vehicle to perform brake traction control on at least one of the left wheel and the right wheel, causing the ABS module of the vehicle to perform brake traction control comprising:
determining an effective speed differential between the left wheel and the right wheel;
determining a steering angle by a position sensor operatively connected to a steering assembly of the vehicle; and
based on the effective speed differential and the steering angle, controlling a pressure applied to the at least one of the left wheel and the right wheel by the ABS module performing brake traction control on the at least one of the left wheel and the right wheel; and
when the drive mode changes from a 4×4 position to a 2×4 position:
uncoupling the left and right wheels from the motor.

15. The method of claim 14, wherein determining the effective speed differential comprises:
determining a speed of rotation of the left wheel;
determining a speed of rotation of the right wheel; and
determining a speed of travel of the vehicle.

16. The method of claim 14, wherein determining that at least one of the left and right wheels is slipping comprises:
determining that an engine torque indicator is above a pre-determined engine threshold; and
in response to the engine torque indicator being above the pre-determined engine threshold, causing the ABS module to perform brake traction control on the at least one of the left wheel and the right wheel.

17. The method of claim 16, wherein determining that the engine torque indicator is above the pre-determined engine threshold comprises at least one of:
determining, by a throttle valve position sensor, a throttle position value;
determining, by an engine control module, an engine torque output; and
determining, by a pedal position sensor, a pedal position value.

18. The method of claim 14, wherein determining that at least one of the left and right wheels is slipping comprises:
determining that an effective speed differential between the left wheel and the right wheel is above a pre-determined speed threshold; and
in response to the effective speed differential being above the pre-determined speed threshold, causing the ABS module to perform brake traction control on the at least one of the left wheel and the right wheel.

19. The method of claim 14, wherein causing the ABS module of the vehicle to perform brake traction control further comprises:
determining that a locking differential is in an unlocked differential mode, the locking differential being connected between the left driven wheel and the right driven wheel, the locking differential being selectively changeable between a locked differential mode and the unlocked differential mode; and
in response to the locking differential being in the unlocked differential mode, further causing the ABS module to perform brake traction control on at least one of the left driven wheel and the right driven wheel.

* * * * *